United States Patent
Liu et al.

(10) Patent No.: US 6,510,493 B1
(45) Date of Patent: Jan. 21, 2003

(54) METHOD AND APPARATUS FOR MANAGING CACHE LINE REPLACEMENT WITHIN A COMPUTER SYSTEM

(75) Inventors: Peichun Peter Liu, Austin, TX (US); Francis Patrick O'Connell, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/354,127

(22) Filed: Jul. 15, 1999

(51) Int. Cl.⁷ .............................................. G06F 12/00
(52) U.S. Cl. ........................ 711/133; 711/135; 711/136; 711/159; 711/160
(58) Field of Search ................................. 711/133, 135, 711/136, 159, 160

(56) References Cited

U.S. PATENT DOCUMENTS

| | | | |
|---|---|---|---|
| 4,928,239 A | 5/1990 | Baum et al. | 711/136 |
| 5,249,282 A | 9/1993 | Segers | 711/122 |
| 5,353,425 A | 10/1994 | Malamy et al. | 711/144 |
| 5,369,753 A | 11/1994 | Tipley | 711/122 |
| 5,465,342 A | 11/1995 | Walsh | 711/119 |
| 5,481,691 A | 1/1996 | Day et al. | 711/133 |
| 5,564,035 A | 10/1996 | Lai | 711/144 |
| 5,666,482 A | 9/1997 | McClure | 714/4 |
| 5,737,749 A | 4/1998 | Patel et al. | 711/123 |
| 6,138,213 A * | 10/2000 | McMinn | 711/137 |
| 6,260,114 B1 * | 7/2001 | Schug | 711/129 |
| 6,272,598 B1 * | 8/2001 | Arlitt et al. | 711/133 |

* cited by examiner

Primary Examiner—Do Hyun Yoo
Assistant Examiner—Mehdi Namazi
(74) Attorney, Agent, or Firm—Anthony V. S. England; Bracewell & Patterson, L.L.P.

(57) ABSTRACT

A cache memory having a mechanism for managing cache lines replacement is disclosed. The cache memory comprises multiple cache lines partitioned into a first group and a second group. The number of cache lines in the second group is preferably larger than the number of cache lines in the first group. A replacement logic block selectively chooses a cache line from one of the two groups of cache lines for replacement during an allocation cycle.

9 Claims, 4 Drawing Sheets

METHOD AND APPARATUS FOR MANAGING CACHE LINE REPLACEMENT WITHIN A COMPUTER SYSTEM

BACKGROUND OF THE INVENTION

1. Technical Field

The present invention relates to data storage in general and, in particular, to a cache memory for storing data within a computer system. Still more particularly, the present invention relates to a mechanism for managing cache line replacement within a computer system.

2. Description of the Prior Art

Many high-performance data processing systems include both a system memory and a cache memory. A cache memory is a relatively high-speed memory that stores a copy of information that is also stored in one or more portions of the system memory. A cache line typically includes a directory for storing address tags, and a cache entry array for storing instructions or data. A compare match of an incoming address with one of the tags within the directory indicates a cache "hit;" otherwise, it is considered as a cache "miss."

Typically, if there is a cache miss when all the cache lines within the cache memory are filled, then one of the cache lines within the cache memory must be selected for replacement. There are different cache replacement algorithms that are well-known to those skilled in the relevant art, none of which can provide optimal results on all software applications. For example, a least-recently used (LRU) replacement algorithm removes data from a cache memory if the re-use latency of the data is relatively long. However, if the data is required between groups of data stream that completely fill the cache memory, the data will be flushed from the cache memory, forcing the data to be reloaded back to the cache memory again after each large volume of data stream. Consequently, it is desirable to provide an improved mechanism for managing cache line replacement within a computer system such that optimal results can be achieved for a larger group of software applications.

SUMMARY OF THE INVENTION

In accordance with a preferred embodiment of the present invention, a cache memory comprises multiple cache lines that are partitioned into a first group and a second group. The number of cache lines in the second group is preferably larger than the number of cache lines in the first group. A replacement logic block selectively chooses a cache line from one of the two groups of cache lines for replacement during an allocation cycle.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in any data processing system having a cache memory. Also, it should be understood that the features of the present invention may be applicable in various data processing systems having a multi-level cache memory hierarchy.

Figure 1:
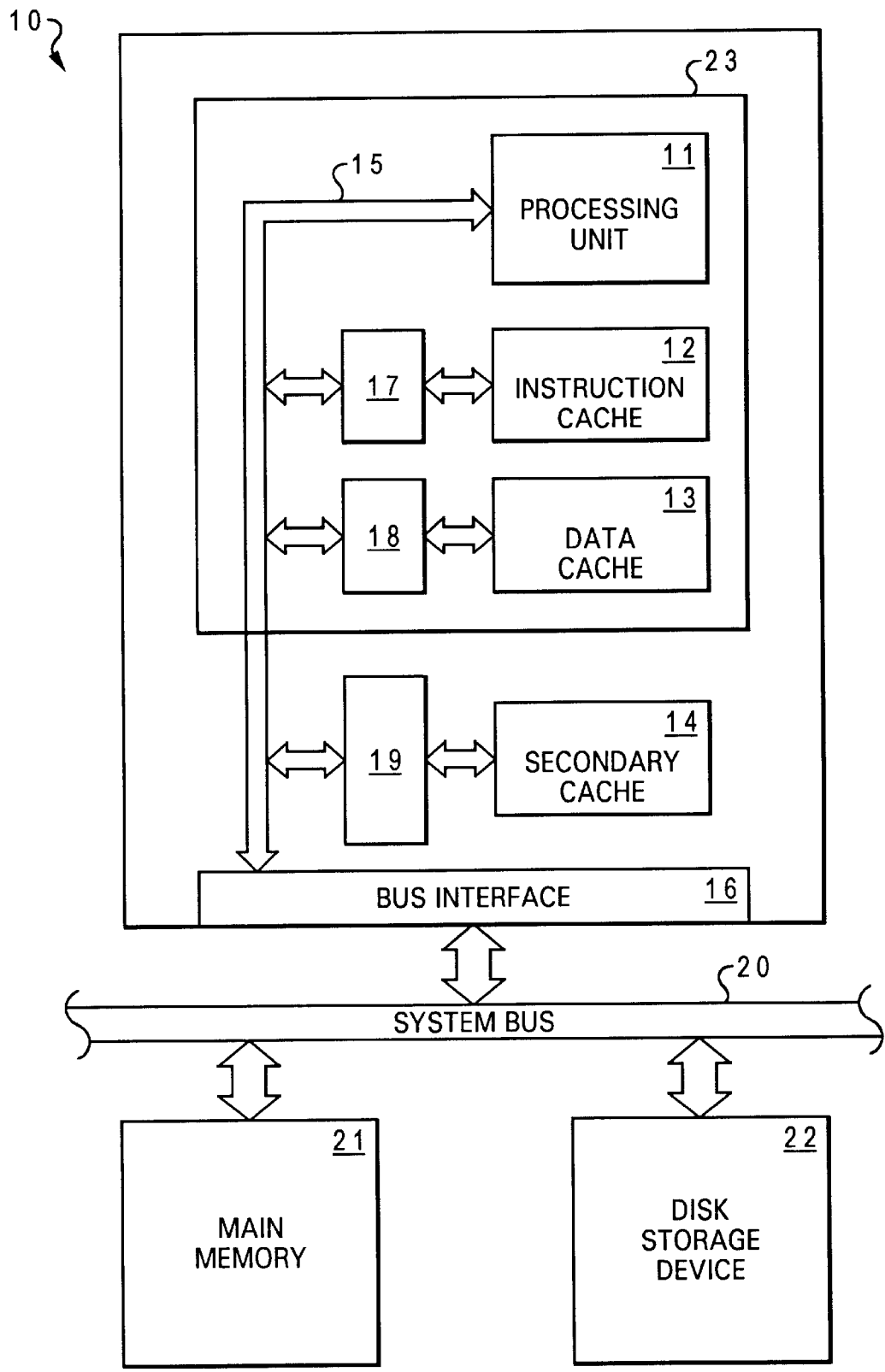
FIG. 1 is a block diagram of a data processing system having a multi-level cache memory hierarchy in which the present invention may be incorporated.

Referring now to the drawings and in particular to FIG. 1, there is illustrated a block diagram of a data processing system 10 having a multi-level cache memory hierarchy in which the present invention may be incorporated. Processor 23 is constructed as a monolithic integrated circuit device comprising a processing unit 11, an on-chip instruction cache 12, and an on-chip data cache 13. Both caches 12, 13 are primary caches and are connected to processing unit 11 by paths within a local bus structure. As shown, instruction cache 12 is coupled to processing unit 11 via a local bus 15 and a cache controller 17, while data cache 13 is coupled to processing unit 11 via local bus 15 and a cache controller 18.

A secondary cache 14 is coupled to processing unit 11 via local bus 15 and a cache controller 19. Secondary cache 14 is typically much larger than either instruction cache 12 or data cache 13, and access to secondary cache 14 is somewhat slower than to either instruction cache 12 or data cache 13. Processing unit 11 is connected to a system bus 20 via a bus interface 16 in which timing and control translations between local bus 15 and system bus 20 take place. A main memory 21 and a disk storage device 22 are also coupled to system bus 20.

As depicted in FIG. 1, the memory hierarchy is organized from the fastest to the slowest, from the smallest to the largest, and from the most expensive per bit to the least expensive per bit, in progression from primary caches 12, 13 to secondary cache 14, to main memory 21, and to disk storage device 22. Typically, main memory 21 contains a subset of what is in disk storage device 22, and secondary cache 14 contains a subset of what is in main memory 21.

Depending on the relationship between primary caches 13, 14 and secondary cache 16, each of primary caches 13, 14 may contain information independent of what is in secondary cache 14 (i.e., primary caches may not enforce strong inclusivity).

Processing unit 11 can access primary caches 12, 13 within a single processor cycle, while it may take several processor cycles to access secondary cache 14. If a cache "miss" occurs in primary caches 12, 13 and secondary cache 14, then main memory 21 is accessed to perform a cache allocation (or linefill operation), which entails replacing a cache line with a group of data from main memory 21 that contains the information requested by processing unit 11. This cache allocation must be performed in order to satisfy the attempted cache access for which a cache "miss" occurred. If main memory 21 does not contain the information for which the cache allocation is attempted, then a page containing this data is obtained from disk storage device 22 such that the cache allocation can be completed.

As mentioned previously, there is not a single cache replacement algorithm that can provide optimal results for all application software. This is because each application software has a different data demand requirement from the others. Thus, optimal results can only be achieved if application software can inform the cache memory as to what information should be replaced quickly, and what information should be replaced slowly. This lifetime requirement of an instruction within a software application can be included with page information in a translation lookaside buffer (TLB), or with compiler hints within the instruction.

In light of the above, the present invention provides an improved method of managing the replacement of cache entries, which allows certain instruction or data to have a longer temporal locality than others at any time, while still providing a gradual fair replacement of the cache lines within the entire cache memory.

Figure 2:
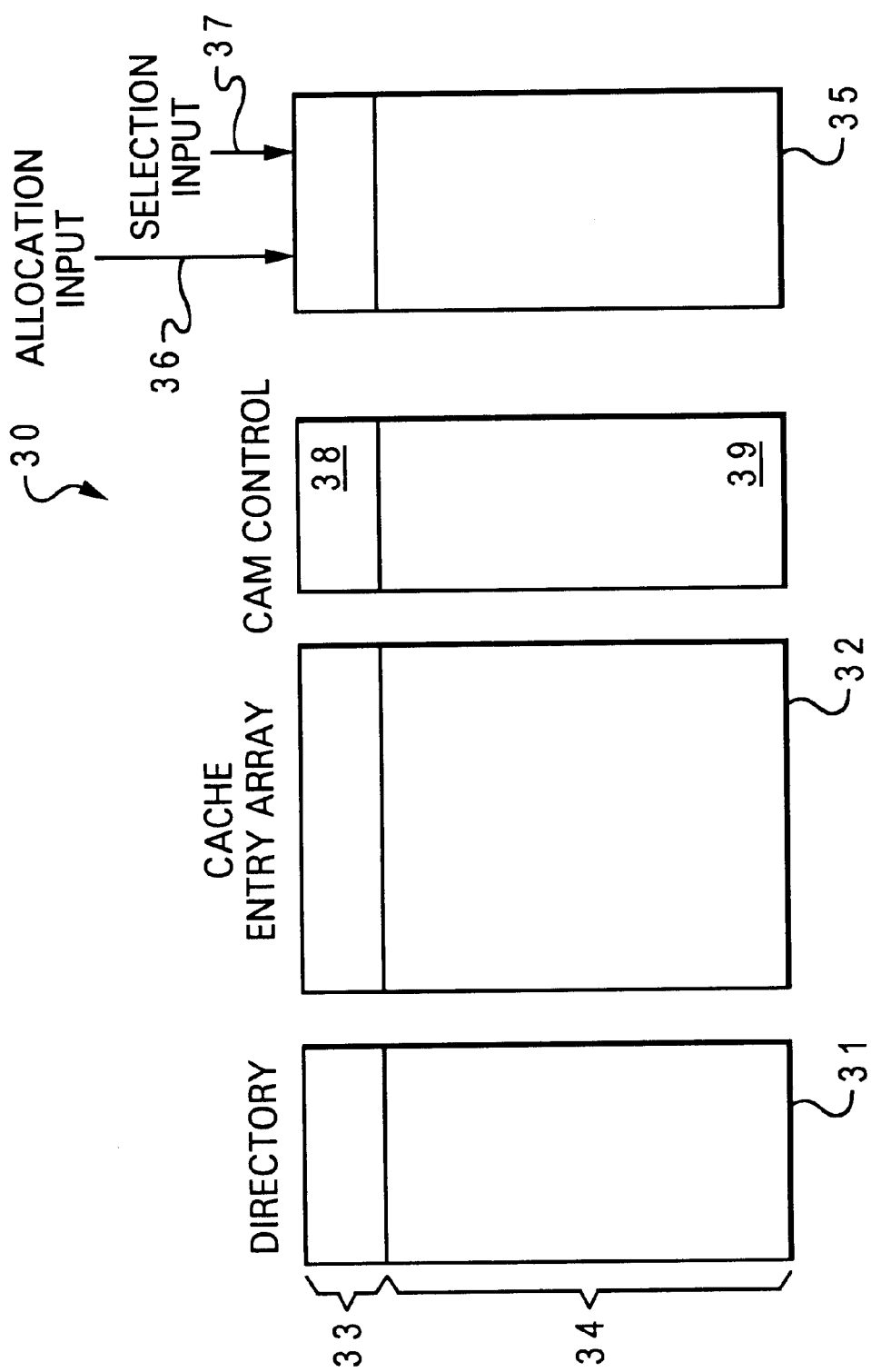
FIG. 2 is a block diagram of a cache memory in accordance with the present invention.

With reference now to FIG. 2, there is depicted a block diagram of a cache memory in accordance with the present invention. This cache memory is preferably a primary cache memory such as instruction cache 12 and data cache 13 from FIG. 1. As shown, a cache memory 30 includes a directory 31 for storing address tags and a cache entry array 32 for storing instructions (or data). Directory 31 also contains state bits and inclusivity bits (not shown) as they are known to those skilled in the art. Thus, each cache line within cache memory 30 includes an address tag and its associated data. Furthermore, cache memory 30 is divided into two partitions, namely, a first partition 33 and a second partition 34. It is preferred to have an unequal number of cache lines between first partition 33 and second partition 34. In the present embodiment, first partition 33 contains eight cache lines and second partition 34 contains 128 cache lines, though any number of cache lines is acceptable in each partition.

Cache memory 30 is preferably a content-addressable memory (CAM). As shown, a CAM control block 38 is associated with first partition 33, and a CAM control block 39 is associated with second partition 34.

In addition to directory 31 and cache entry array 32, a replacement logic block 35 provides the necessary logic to allocate a cache line within cache memory 30. Replacement logic block 35 is controlled by an allocation input 36 and a selection input 37. Preferably, allocation input 36 is inactive during a normal cache access cycle (such as a read or write cycle), and is active when a cache line needs to be replaced. Selection input 37 is a software controllable signal input through which a cache line from one of the two partitions can be selected for allocation. For example, during an allocation cycle (i.e., when allocation input 36 is active), a cache line from first partition 33 is selected for allocation when selection input 37 is asserted, and a cache line from second partition 34 is selected for allocation when selection input 37 is not asserted.

In the present embodiment, any instruction (or data) that require a longer temporal locality will preferably be stored in first partition 33 while other data will be stored in second partition 34. The cache replacement algorithm utilized in first partition 33 can be identical or different from the cache replacement algorithm utilized in second partition 34. For example, first partition 33 and second partition 34 can both utilize a least-recently used (LRU) replacement algorithm; or as another example, first partition 33 utilizes the LRU replacement while second partition 34 utilizes a first-in-first-out (FIFO) algorithm.

Figure 3:
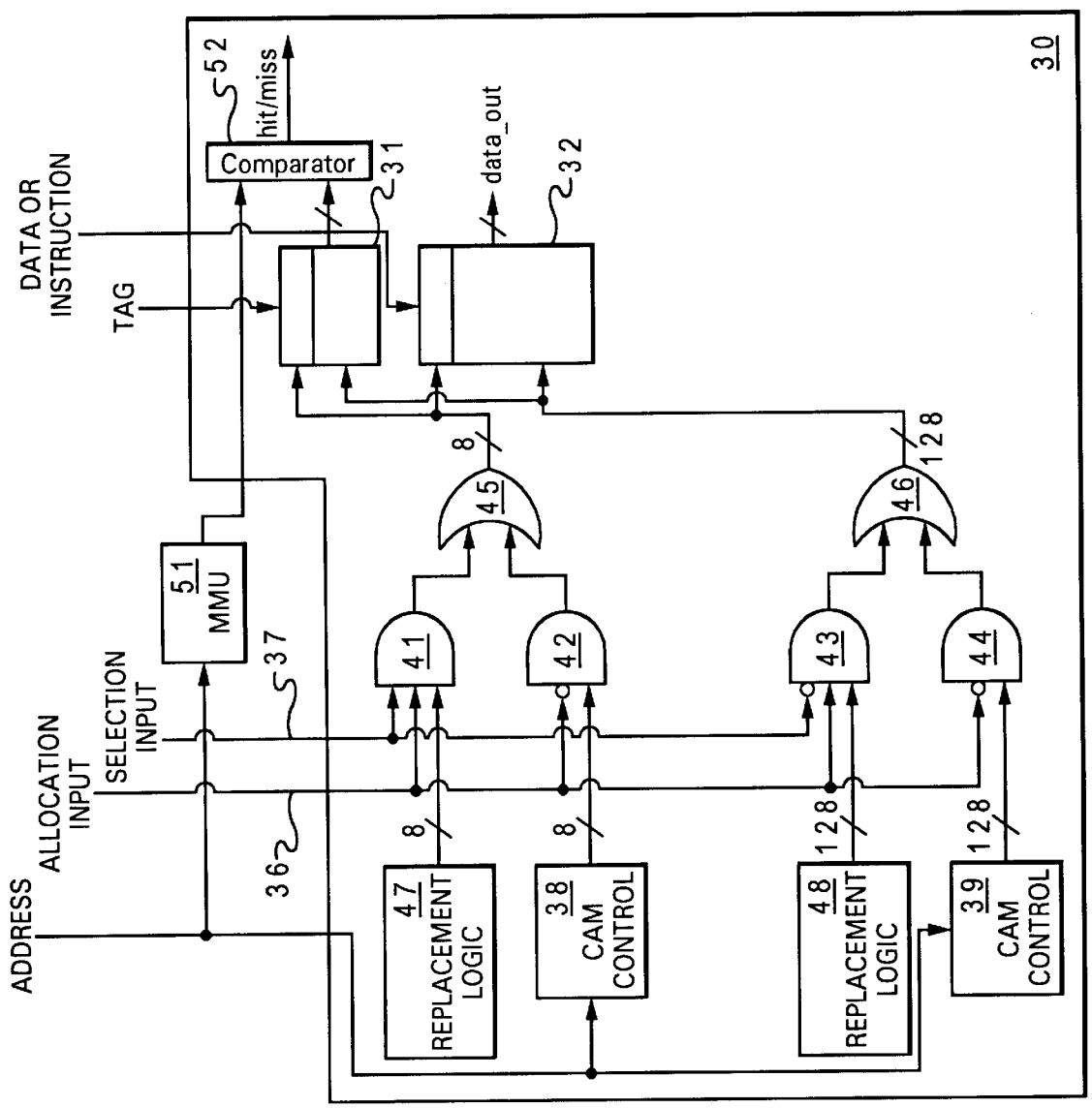
FIG. 3 is a detailed logical block diagram of cache memory 30 from FIG. 2, in accordance with a preferred embodiment of the present invention.

Referring now to FIG. 3, there is illustrated a detailed logical block diagram of cache memory 30 from FIG. 2, in accordance with a preferred embodiment of the present invention. As shown, a replacement logic 47 for first partition 33 (from FIG. 2) is coupled to eight three-input AND gates 41, a CAM control block 38 for first partition 33 is coupled to eight two-input AND gates 42, a replacement logic 48 for second partition 34 (from FIG. 2) is coupled to 128 three-input AND gates 43, and a CAM control block 39 for second partition 34 is coupled to 128 two-input AND gates 44. Each of AND gates 41, 42 is respectively coupled to directory 31 and cache entry array 32 via eight two-input OR gates 45. Similarly, each of AND gates 43, 44 is respectively coupled to directory 31 and cache entry array 32 via 128 two-input OR gate 46. Replacement logic 47–48 and gates 41–46 are preferably part of replacement logic block 35 from FIG. 2.

During a normal cache access cycle, a cache hit or cache miss is determined by comparing an address from memory management unit (MMU) 51 with the tag from directory 31 via a comparator 52. Allocation input 36 is not asserted during the normal cache access cycle. During an allocation cycle after a cache miss, allocation input 36 is first asserted. Then, a cache line from first partition 33 will be selected for allocation if selection input 37 is asserted; otherwise, a cache line from second partition 34 is selected for allocation when selection input 37 is not asserted. Whether or not selection input 37 should be asserted during the allocation cycle is determined by a lifetime requirement of an instruction or data within a software application. As such, the assertion election of selection input 37 may be controlled by a software application. Once the election is made, replacement logic 47 is responsible for selecting a cache line from first partition 33 for replacement, and replacement logic 48 is responsible for selecting a cache line from second partition 34 for replacement. As mentioned previously, the replacement algorithm used within replacement logic for first partition 33 can be identical or different from the replacement algorithm used within replacement logic for second partition 34.

Figure 4:
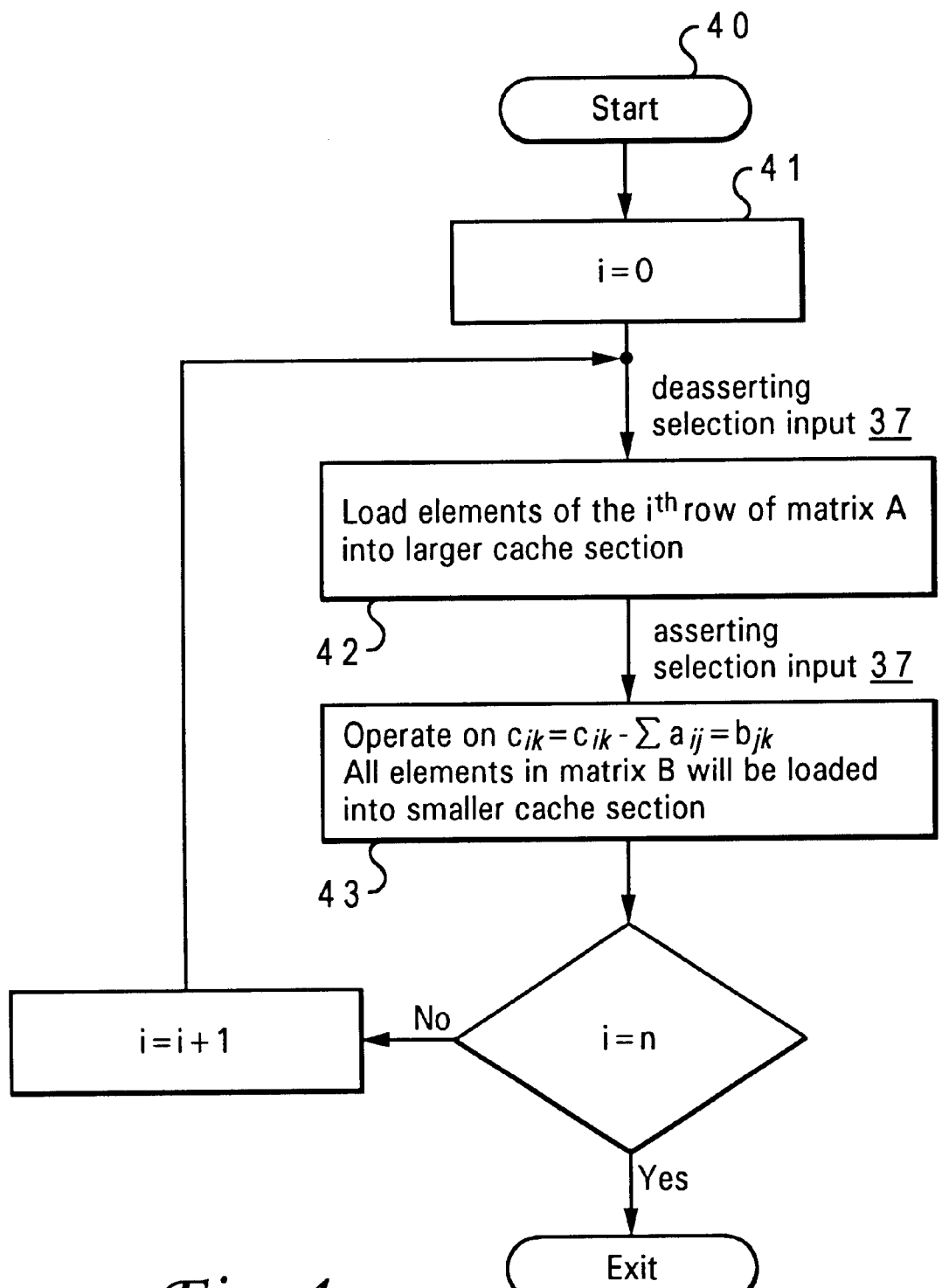
FIG. 4 is a high-level flow diagram of an exemplary application of a preferred embodiment of the present invention.

The application of the present invention can be illustrated by way of a matrix multiplication example of multiplying matrix $A=[a_{ij}](0 \geq i \geq n, 0 \geq j \geq m)$ and matrix $B=[b_{jk}]$ $(0 \geq j \geq m, 0 \geq k \geq l))$ to generate matrix $C=[c_{ik}](0 \geq i \geq n, 0 \geq k \geq l)$. With reference now to FIG. 4, there is illustrated a high-level flow diagram of an exemplary application of a preferred embodiment of the present invention. Starting at block 40, a variable i is initialized to zero, as shown in block 41. At this point, selection input 37 (from FIG. 3) is not asserted, and elements of the $i^{th}$ row of matrix A are loaded into second partition 34 (from FIG. 2) of the cache memory, as depicted in block 42. Then, selection input 37 is asserted, and all elements of matrix B are loaded into first partition 33 (from FIG. 2) of the cache memory, as depicted in block 43. Subsequently, the matrix multiplication is performed until i=n. In this example, the more "permanent" data are loaded into the smaller section of the cache, and the other data are loaded into the larger section of the cache.

As has been described, the present invention provides a method and apparatus for managing cache line replacement within a cache memory. The present invention overcomes a prior art cache design problem of inadvertent premature removal of instruction (or data) from a cache memory during a cache line allocation. The present invention provides an enhanced cache line replacement process by allowing some critical by not frequently used data to be remain in the cache memory. While the additional control logic may complicate the cache memory construction (and requires extra silicon area), the benefits derived from the present invention generally outweigh such concerns, especially when the cost of additional circuitry diminishes with respect to the demand for higher processor performance.

While the invention has been particularly shown and described with reference to a preferred embodiment, it will be understood by those skilled in the art that various changes in form and detail may be made therein without departing from the spirit and scope of the invention.

What is claimed is:

1. A cache memory, comprising:
    a plurality of cache lines partitioned into a first group and a second group, wherein said second group contains more cache lines than said first group; and
    a replacement logic block for selectively choosing a cache line from one of said two groups of cache lines for replacement during an allocation cycle, wherein said replacement logic block includes a first replacement logic means for replacing cache lines from said first group and a second replacement logic means for replacing cache lines from said second group.

2. The cache memory according to claim 1, wherein said replacement logic block includes an allocation input and a selection input.

3. The cache memory according to claim 2, wherein an assertion of said selection input is controlled by a lifetime requirement of an instruction/data within a software application.

4. The cache memory according to claim 1, wherein said first replacement logic means and said second replacement logic means utilize an identical cache line replacement algorithm.

5. The cache memory according to claim 1, wherein said first replacement logic means and said second replacement logic means utilize different cache line replacement algorithms.

6. A method for managing cache line replacement within a cache memory, said method comprising the steps of:
    partitioning a plurality of cache lines into a first group and a second group, wherein said second group contains more cache lines than said first group;
    providing a first cache line replacement algorithm for replacing cache lines from said first group and a second cache line replacement algorithm for replacing cache lines from said second group; and
    selectively choosing a cache line from one of said two groups of cache lines for replacement during an allocation cycle.

7. The method according to claim 6, wherein said choosing step further includes a step of choosing a cache line from one of said two groups of cache lines for replacement in accordance with a lifetime requirement of an instruction/data within a software application.

8. The method for according to claim 6, wherein said first cache line replacement algorithm is identical to said second cache line replacement algorithm.

9. The cache memory according to claim 6, wherein said first cache line replacement algorithm is different from said second cache line replacement algorithm.

* * * * *

UNITED STATES PATENT AND TRADEMARK OFFICE
CERTIFICATE OF CORRECTION

PATENT NO. : 6,510,493 B1
DATED : January 21, 2003
INVENTOR(S) : Liu et al.

It is certified that error appears in the above-identified patent and that said Letters Patent is hereby corrected as shown below:

<u>Column 4,</u>
Line 47, "$\mathbf{A}=[a_{ij}](0 \geq i \geq n, 0 \geq j \geq m)$" should be replaced with -- $\mathbf{A} = [a_{ij}] (0 \leq i \leq n, 0 \leq j \leq m)$ --.
Lines 47 & 48, "$\mathbf{B}=[b_{jk}](0 \geq j \geq m, 0 \geq k \geq 1)$" should be replaced with -- $\mathbf{B} = [b_{jk}] (0 \leq j \leq m, 0 \leq k \leq 1)$ --.
Lines 48 & 49, "$\mathbf{C}=[c_{ik}](0 \geq i \geq n, 0 \geq k \geq 1)$" should be replaced with -- $\mathbf{C} = [c_{ik}] (0 \leq i \leq n, 0 \leq k \leq 1)$ --.

Signed and Sealed this

Fifth Day of August, 2003

JAMES E. ROGAN
*Director of the United States Patent and Trademark Office*